(12) United States Patent
Sandoe et al.

(10) Patent No.: US 6,756,332 B2
(45) Date of Patent: Jun. 29, 2004

(54) VEHICLE HEADLINER AND LAMINATE THEREFOR

(75) Inventors: Michael D. Sandoe, Grand Rapids, MI (US); Michael G. Zimmer, Belmont, MI (US)

(73) Assignee: Jason Incorporated, Milwaukee, WI (US)

( * ) Notice: Subject to any disclaimer, the term of this patent is extended or adjusted under 35 U.S.C. 154(b) by 184 days.

(21) Appl. No.: 09/681,822

(22) Filed: Jun. 11, 2001

(65) Prior Publication Data

US 2001/0036788 A1 Nov. 1, 2001

Related U.S. Application Data

(63) Continuation of application No. 09/239,112, filed on Jan. 28, 1999, now abandoned.
(60) Provisional application No. 60/073,077, filed on Jan. 30, 1998.

(51) Int. Cl.[7] .......................... D04H 1/00; D04H 13/00; D04H 3/00; D04H 5/00; B32B 27/02; B32B 5/26
(52) U.S. Cl. ...................... 442/344; 442/347; 442/351; 442/361; 442/392; 428/903
(58) Field of Search ................................ 442/340, 341, 442/361, 381, 391, 392, 344, 351, 347; 428/903

(56) References Cited

U.S. PATENT DOCUMENTS

| | | |
|---|---|---|
| 2,331,321 A | 10/1943 | Heaton |
| 2,768,026 A | 10/1956 | Stephens et al. |
| 3,046,173 A | 7/1962 | Copeland |
| 3,082,143 A | 3/1963 | Smith |
| 3,265,530 A | 8/1966 | Marzocchi et al. |
| 3,341,394 A | 9/1967 | Kinney |
| 3,506,532 A | 4/1970 | Bock et al. |
| 3,531,367 A | 9/1970 | Karsten |
| 3,620,906 A | 11/1971 | Hannes |
| 4,002,367 A | 1/1977 | Thomas |
| 4,002,567 A | 1/1977 | Konno et al. |
| 4,059,660 A | 11/1977 | Roth et al. |
| 4,119,749 A | 10/1978 | Roth et al. |
| 4,142,016 A | 2/1979 | Perry |
| 4,195,112 A | 3/1980 | Sheard et al. |
| 4,256,797 A | 3/1981 | Stamper et al. |
| 4,320,167 A | 3/1982 | Wishman |
| 4,352,522 A | 10/1982 | Miller |
| 4,363,848 A | 12/1982 | LeDuc et al. |
| 4,397,910 A | 8/1983 | Benson et al. |
| 4,420,526 A | 12/1983 | Schilling et al. |
| 4,445,954 A | 5/1984 | Adams et al. |
| 4,451,315 A | 5/1984 | Miyazaki |

(List continued on next page.)

FOREIGN PATENT DOCUMENTS

GB 1149270 11/1967

*Primary Examiner*—Elizabeth M. Cole
*Assistant Examiner*—Jeremy R. Pierce
(74) *Attorney, Agent, or Firm*—McGarry Bair PC

(57) ABSTRACT

A headliner made from a laminate comprising a core layer sandwiched between two stiffening layers to form an I-beam construction that provides the necessary strength for the headliner. The core layer is preferably a blend of nonwoven fibers including some fine denier fibers to provide improved sound absorption properties. The stiffening layers also comprise a blend of nonwoven fibers. Both the core layer and the stiffening layers include some binder fibers to bond together the various fibers within each layer and the layers to each other.

56 Claims, 1 Drawing Sheet

U.S. PATENT DOCUMENTS

| | | |
|---|---|---|
| 4,463,043 A | 7/1984 | Reeves et al. |
| 4,474,846 A | 10/1984 | Doerer et al. |
| 4,476,183 A | 10/1984 | Holtrop et al. |
| 4,477,516 A | 10/1984 | Sugihara et al. |
| 4,489,126 A | 12/1984 | Holtrop et al. |
| 4,490,425 A | 12/1984 | Knoke et al. |
| 4,521,477 A | 6/1985 | Kiss |
| 4,526,831 A | 7/1985 | Hatchadoorian et al. |
| 4,531,994 A | 7/1985 | Holtrop et al. |
| 4,536,440 A | 8/1985 | Berg |
| 4,539,252 A | 9/1985 | Franz |
| 4,568,581 A | 2/1986 | Peoples, Jr. |
| 4,600,621 A | 7/1986 | Maurer et al. |
| 4,608,104 A | 8/1986 | Holtrop et al. |
| 4,610,478 A | 9/1986 | Tervol |
| 4,680,219 A | 7/1987 | Vernois |
| 4,729,917 A | 3/1988 | Symdra et al. |
| 4,766,029 A | 8/1988 | Brock et al. |
| 4,778,717 A | 10/1988 | Fitchmum |
| 4,784,898 A | 11/1988 | Raghava |
| 4,784,903 A | 11/1988 | Kiss |
| 4,828,910 A | 5/1989 | Haussling |
| 4,840,832 A | 6/1989 | Weinle et al. |
| 4,851,283 A | 7/1989 | Holtrop et al. |
| 5,007,976 A | 4/1991 | Satterfield et al. |
| 5,068,001 A | 11/1991 | Haussling |
| 5,082,716 A | 1/1992 | Satterfield et al. |
| 5,132,166 A | 7/1992 | Adams et al. |
| 5,145,727 A | 9/1992 | Potts et al. |
| 5,223,329 A | 6/1993 | Amann |
| 5,286,557 A | 2/1994 | Jacob et al. |
| 5,298,319 A | 3/1994 | Donahue et al. |
| 5,354,604 A | 10/1994 | Blakeman et al. |
| 5,403,444 A | 4/1995 | Goettmann et al. |
| 5,486,256 A | 1/1996 | Romesberg et al. |
| 5,492,580 A | 2/1996 | Frank |
| 5,501,898 A | 3/1996 | Föttinger et al. |
| 5,503,903 A | 4/1996 | Bainbridge et al. |
| 5,532,050 A | 7/1996 | Brooks |
| 5,554,442 A | 9/1996 | Matsunaga et al. |
| 5,554,831 A * | 9/1996 | Matsukawa et al. ........ 442/334 |
| 5,591,289 A | 1/1997 | Souders et al. |
| 5,773,375 A | 6/1998 | Swan et al. |
| 6,008,149 A * | 12/1999 | Copperwheat .............. 442/381 |
| 6,066,388 A | 5/2000 | Van Kerrebrouck |
| 6,156,682 A * | 12/2000 | Fletemier et al. ........... 442/381 |
| 6,322,658 B1 * | 11/2001 | Byma et al. ................. 442/381 |

* cited by examiner

VEHICLE HEADLINER AND LAMINATE THEREFOR

CROSS REFERENCE TO RELATED APPLICATIONS

This application is a continuation in part of U.S. patent application Ser. No. 09/239,112, filed Jan. 28, 1999, now abandoned, which claims priority on U.S. provisional patent application No. 60/073,077, filed Jan. 30, 1998.

BACKGROUND OF INVENTION

1. Field of the Invention

The invention relates to vehicle headliners. In one of its aspects, the invention relates to a vehicle headliner. In another of its aspects, the invention relates to a laminate construction for a vehicle headliner that optimizes formability, sound absorbing properties and structural integrity of the vehicle headliner.

2. Description of the Related Art

Vehicle headliners on the interior of an automobile are a decorative panel which separates the passenger compartment from the sheet metal forming the roof of the vehicle. The vehicle headliners absorb sounds from within the passenger compartment as well as sounds originating outside the passenger compartment. Soft fibrous materials are typically used for this function, but must be stiffened to give the headliners sufficient structural rigidity to avoid sag in service under all types of service conditions. It is further important that the overall thickness of the headliner be relatively small to maximize headroom within the vehicle compartment. In many applications, it is expected that the headliner will be sufficiently strong to support its own weight.

Previous commercial headliners have been made with fiberglass batting which is impregnated with a thermosetting resin for rigidity. Some of these panels have been relatively brittle and have failed when installed into vehicles. Further, glass fibers can cause handling problems. These headliners are typically not recyclable.

The required headliner properties of sound absorption, rigidity, and minimum thickness often conflict with each other and compromises must be made to reach optimum properties. Sound absorption is most easily obtained by making the headliner from a low density material that absorbs the sound waves as they enter the headliner and minimizes reflection of the sound waves as would more dense materials. In general, the greater the thickness of the low-density material, the greater the sound absorption but, thicker materials have a greater tendency to sag and adversely affect headroom. Generally, dense materials are used to provide the headliner with the necessary structural strength and rigidity for supporting its own weight and possibly mounting components to the headliner. More dense materials, in general, tend to reflect sound and thus, negatively impact sound absorption.

Some prior headliners have attempted to resolve the conflict between the sound absorbing and structural rigidity requirements for the headliner by making the headliner from a laminate of various materials, wherein some of the materials provide the structural rigidity and other of the materials provide the sound absorbing properties. One approach is to use a relatively low-density sound absorbing material sandwiched between two layers of reinforcing material. One of the reinforcing material layers has mounted thereto a decorative cover that forms the ceiling of the passenger compartment of the vehicle. An example of this structure, which is known as an I-beam construction, is disclosed in U.S. Pat. No. 4,828,910 to Haussling, issued May 9, 1989.

Most prior I-beam constructions use a thermosetting resin to bind together the various layers of the laminate. The resin is normally sprayed in liquid form on at least one of the abutting surfaces of the various layers. In general, the thermosetting resin negatively impacts the sound absorbing characteristics of the laminate because the resin can fill the interstitial spaces between the fibers in the laminate and thereby increase the reflectance of the sound waves instead of absorbing the sound waves. Thermosetting resins also make it more difficult if not impossible to recycle the laminate, which is an important characteristic and often a requirement of most components used in contemporary vehicle construction.

The U.S. patent to Weinle, U.S. Pat. No. 4,840,832, issued Jun. 20, 1989, discloses a headliner construction of a bicomponent fiber wherein the fibers are bonded together at their crossing points. The headliner is said to be so highly deformable and resilient that it can be bent or flexed nearly double to facilitate installation in an automobile side window and subsequently will resiliently recover to its original molded shape. Actual embodiments of these headliners have not had sufficient rigidity to avoid sag when subjected to elevated temperatures normally experienced in vehicles except when the mass and density of the headliners is very high, thereby negatively impacting vehicle fuel efficiency.

U.S. Pat. No. 6,066,388 to Van Kerrebrouck discloses a non-woven laminate comprising two outer fiber layers and at least one inner fiber layer having a different composition from that of the outer layers. The inner layer contains constructive fibers having a thickness of 3–100 dtex in combination with 20–100% binding fibers. The outer layers comprise constructive fibers having a thickness of 0.5–28 dtex in combination with 40–100% binding fibers. The thickness of the constructive fibers of the outer layers are thinner than the constructive fibers of the inner layer.

SUMMARY OF INVENTION

According to the invention, a laminate for use in making a thermoformed article comprises first and second strengthening outer layers and a core layer between the strengthening layers. The core layer comprises a bait of nonwoven thermoplastic fibers having 20–50% fine fibers by weight with a denier in the range of 0.8–3.0, 10–50% binder fibers by weight, and other fibers with a denier in the range of 4.0–15.0. Each of the strengthening layers comprises a bait of nonwoven polymeric fibers having more by weight coarser fibers than in the core layer. The strengthening layers provide the predominant flexural rigidity for the laminate and the core layer provides the predominant sound absorption for the laminate. The thermoplastic fibers can include polyester, polyolefin, and nylon. The polyester fibers preferably include bicomponent fibers, such as a PET sheath-core bicomponent fiber.

The binder fibers preferably have a denier in the range of 0.8–200, with a preferred range of 3–25 denier. The core layer batt has a basis weight in the range of 6–24 ounces/yd$^2$, with a preferred range of 6–12 ounces/yd$^2$. The core layer batt has a thickness of 0.5–2.0 inches, with a preferred thickness of 0.5–1.0 inches.

The laminate can further include first and second web adhesive layers that are positioned between each of the outer layers and the core layer. The web adhesive layers enhance the bonding between the outer layers and the core layer.

Preferably, the web adhesive layer is a sheet of nonwoven polyester fibers.

The outer layers preferably comprise 50–100% by weight of thermoplastic fibers with a denier of 0.8–200 and 0–50% by weight of binder materials. The binder materials can include binder fibers. Additionally, the binder materials can include a thermosetting resin, which is preferably a thermosetting powder that is present in an amount up to 20% by weight of the outer layers.

The strengthening layers are preferably thinner than the core layer. The core layer has a greater resistivity than the strengthening layers. Preferably, each strengthening layer comprises less than 20% fine fibers and the core layer comprises at least 25% fine fibers. The percentage of fine fibers in each of the strengthening layers is preferably not greater than half the percentage of fine fibers in the core layer and the fine fibers of each strengthening layer not exceeding 20%.

Headliners made according to the invention have better sound absorbing properties and yet maintain the required structural rigidity properties, while minimizing thickness and density to maximize vehicle headroom and fuel efficiency, and are recyclable. Further, the headliners according to the invention are free of fiberglass and are flexible enough to avoid failure during installation and are less irritable to workers during handling, while satisfying requirements for low density and dimensional stability.

In yet another embodiment, the invention relates to a laminate comprising first and second strengthening layers and an intermediate core layer. Each of the strengthening layers comprises a batt of nonwoven polymeric fibers. The strengthening layers provide flexural rigidity for the laminate. The core layer provides sound absorption for the laminate and includes a batt of nonwoven thermoplastic fibers. The core layer batt preferably comprises 20–50% fine fibers with a denier in the range of 0.8–3.0, 10–50% binder fibers and the balance regular fibers with a denier in the range of 4.0–15.0, and. The first and second strengthening layers each comprise a batt of nonwoven polymeric fibers and have a density greater than the core layer.

The strengthening layers are preferably thinner than the core layer. The core layer has a greater resistivity than the strengthening layers. Preferably, each strengthening layer comprises less than 20% fine fibers and the core layer comprises at least 25% fine fibers. The percentage of fine fibers in each of the strengthening layers is preferably not greater than half the percentage of fine fibers in the core layer and the fine fibers of each strengthening layer not exceeding 20%.

In another embodiment, the invention relates to a laminate comprising first and second strengthening layers and a core layer disposed between the strengthening layers. The strengthening layers provide the predominate flexural rigidity for the laminate. The core layer provides the predominant sound absorption for the laminate. The core layer includes a batt of nonwoven thermoplastic fibers. The core layer batt comprises 20–50% fine fibers with a denier in the range of 0.8–3.0, and 10–50% binder fibers. The first and second strengthening layers each comprise a batt of nonwoven polymeric fibers and the core layer has a resistivity greater than at least one of the first and second strengthening layers.

BRIEF DESCRIPTION OF DRAWINGS

The invention will now be described with reference to the drawings in which.

DETAILED DESCRIPTION

Figure 1:
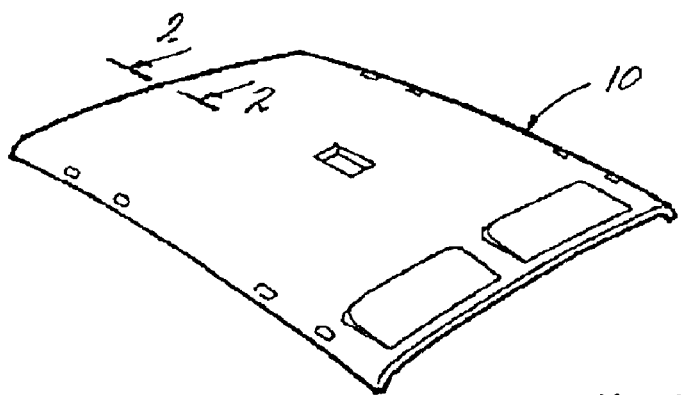
FIG. 1 illustrates a vehicle headliner according to the invention.

FIG. 1 illustrates a headliner 10 according to the invention. The headliner 10 has improved sound absorbing properties in combination with structural rigidity, while maintaining a relatively thin cross-section. The headliner 10 accomplishes the sound absorbing function while maintaining sufficient structural rigidity to avoid bowing or sagging when exposed to heat and is capable of supporting at least its own weight The headliner 10 accomplishes this result without undue thickness, which would undesirably reduce the available headroom in the passenger compartment of the vehicle and without undue density that would decrease vehicle fuel efficiency.

Figure 2:
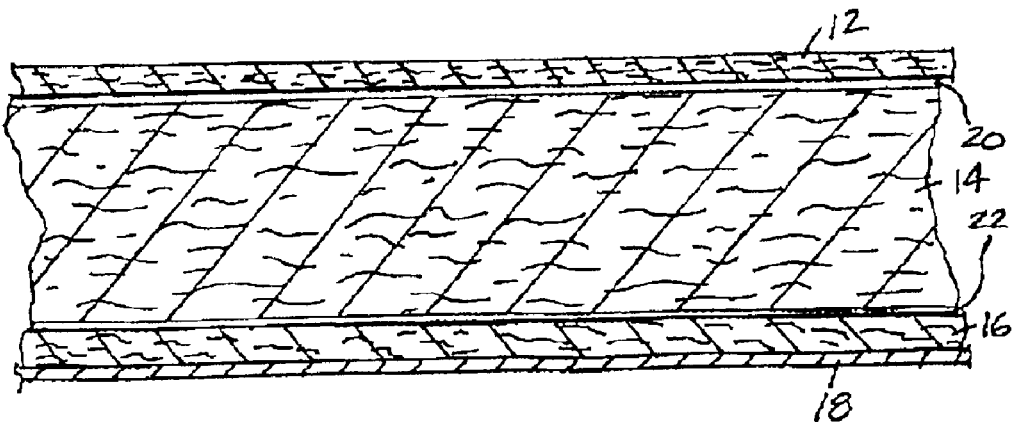
FIG. 2 is a cross-section taken along the lines 2—2 of FIG. 1 illustrating the laminate construction of the vehicle headliner according to the invention.

As best seen in FIG. 2, the headliner 10 comprises a laminate construction including a core layer 12 sandwiched between two stiffening layers 14 and 16. A decorative cover 18 is applied to the stiffening layer (in this case stiffening layer 16) that faces the interior of the vehicle. The decorative fabric covering 18 defines the ceiling of the passenger compartment when the headliner is installed. Preferably, layers of web adhesive 20, 22 are disposed between each stiffening layer 14, 16 and the core layer 12 to enhance the bond therebetween.

The core layer 12 comprises a batt of a blend of nonwoven fibers, including fine denier fibers, regular denier fibers, and binder materials, which preferably includes binder fibers with a lower melting point fiber component. The denier of the fibers in the core layer can vary over a wide range but generally will be in the range of 0.8 to 200, denier, and preferably in the range of 0.8 to 15 denier. Preferably the core layer contains 20–50% by weight (all composition percentages are by weight unless otherwise noted) of tine fibers in the range of approximately 0.8 to 3 denier, of fibers in the range of approximately 4 to 15 denier, and 10–50% binder fibers. At least seine of the binder fibers can be the fine denier fibers and the regular denier fibers, especially if either of these fibers is a bicomponent fiber having a high melting point core and a low melting point sheath, such as is found in U.S. Pat. No. 4,195,112 to Sheard. The binder fibers can also be a blend of high and low melting point thermoplastic fibers.

The core layer batt fiber blend with the fine denier fibers has excellent sound absorption properties while maintaining a low mass. The thickness of the core layer ranges from 0.5 to 2", and is preferably from 0.5 to 1". The basis weight of the core layer 12 can range from 6 to 24 ounces/yd$^2$ and is preferably in the range of 6 to 12 ounces/yd$^2$. The fibers in the core layer can be a variety of synthetic and natural fiber and are preferably thermoplastic fibers, including polyester, polypropylene, nylon, and copolymeric bicomponent fiber of polyester.

The binder fibers can be mixed with the fine and regular denier fibers to provide the core layer 12 with dimensional stability when exposed to high and/or low temperatures, humidity, or mechanical strain. Preferably the binder fibers are fully or partially crystallized bicomponent or staple fibers, such as Hoechstj58, Wellman T0196, or Unitika 7080 polyester or polyolefin bicomponent fibers. The bicomponent fibers are formed a low melting point sheath in combination with a high melting point core construction. The low melting point material will soften and bond with other fibers in the core layer 12 to bond the core layer fibers at their cross over points, leaving open the interstitial spaces between the fibers, permitting the sound waves to pass into the core for absorption.

The stiffening layers 14 and 16 can comprise a batt of similar or dissimilar fiber blends of nonwoven fibers having a denier in the range of 0.8 to 200, and preferably in the range of 3 to 25 denier. The stiffening layers 14 and 16 are generally from 0.1 to 1.0" thick, preferably are from 0.2 to 0.5" thick, and contain 20–50% binder material. The binder material can include binder fibers as well as other materials, such as resins. The stiffening layers have a basis weight in the range of 3 to 24 ounces/yd$^2$, and preferably in the range from 6 to 18 ounces/yd$^2$.

The fibers comprising the stiffening layers 14 and 16 are preferably any thermoplastic plastic fiber, such as polyester, polypropylene, nylon, and copolymer bicomponent fiber of polyester. In essence, the fibers of the stiffening layers 14, 16 can be the same fibers as the core, but preferably do not include the fine fibers because of their relative reduced strength characteristic. But, fine fibers can be included in the stiffening layers as long as the necessary strength is achieved.

Although it is not preferred, it is within the scope of the invention for the stiffening layers to include thermosetting resins but care must be taken to make sure the resin does not block the interstitial spaces between the fibers to a degree that the beneficial sound absorbing properties of the laminate are lost. The clogging of the interstitial spaces increases the batts sound reflection characteristics which prevents the sound waves from entering the core where they can be absorbed. Preferably, a thermosetting powder is used instead of a liquid resin. The thermosetting powder can be applied to the fibers without clogging the interstitial spaces between the fibers as much as a liquid thermosetting resin that is sprayed onto the fibers. The thermosetting binder can include phenolic, epoxy, or urethane binders, for example. If a thermosetting binder material is used, it is preferred that it does not comprise more than 20% of the strengthening layer.

The decorative fabric covering 18 can be made of any suitable fabric conventionally used for headliners and is not a part of the invention. Also, depending on the characteristics of the stiffening layer 16, it is possible to forego the decorative fabric covering 18 if the characteristics of the stiffening layer 16 are aesthetically satisfactory. The decorative covering material 18 preferably comprises urethane foam-backed knit fabrics, or needle punched fabrics.

The web adhesive layers 20, 22 are preferably a sheet of nonwoven thermoplastic fibers having interstitial spaces between the fibers. The fibers are preferably co-polyester. The web adhesive is advantageous or the prior techniques for bonding together the laminate layers, such as a liquid adhesive or liquid resin, because the web adhesive does not fill in the interstitial spaces between the fibers at the interface between the laminate layers but forms a fiber to fiber bond, thereby increasing the bond without substantially decreasing the sound reflectance of the laminate. A suitable web adhesive is PE2900 manufactured by Spunfab, Ltd. Of Cuyahoga Falls, Ohio.

In a preferred embodiment, the core layer 12 has a fiber composition of 40% 0.9 denier 1½ inch polyetheylene teraphalate (PET) fibers, 35% 4 denier 2 inch PET bicomponent fibers, and 25% 15 denier 2 inch PET fibers. The core layer has a nominal thickness of approximately 1-inch and a basis weight of 12 oz/yd$^2$. Each of the stiffening layers has a fiber composition of 40% 4 denier 2 inch PET heat resistant sheath core bicomponent fibers and 60% 15 denier 2 inch PET fibers. The stiffening layers have a nominal thickness of 0.30 inches and a basis weight of 12 oz/yd$^2$. The web adhesive layer is a thermoplastic PET web adhesive (Spunfab PE2900).

The headliner 10 is preferably manufactured by simultaneously thermoforming the core layer 12, stiffening layers 14 and 16, and the decorative fabric covering 18 and web adhesive layers 20, 22 if used. The thermoforming can include preheating of the materials using radiant, conductive or convective sources followed by molding in cold tools, or by molding in thermally regulated warm or hot tools.

During molding of the headliner, the mold is closed and cooled to a temperature less than the melting point of the binder materials to thereby set the thermopistic binder materials and form the fiber to fiber bonds at the fiber cross over points. Alternatively, cool laminate may be presented to a thermally regulated warm or hot tool to thereby soften the binder materials and form the fiber to fiber bonds. The laminate is compressed (either before or after the softening of the binder material) to form the desired contoured surface of the headliner and, in many cases, structural ribs in headliner. The amount of heating and compression will depend on the materials used in the laminate and the desired properties of the final headliner. After heating and compression, the general overall thickness of the headliner is about 20 mm and the structural ribs have a thickness of about 2 mm.

If no web adhesive or other adhesive is used between the layers, the layers can be self-bonded together under the influence of heat pressure of the molding operation which causes at the interface between the layers to bond at the fiber cross over points. If the decorative fabric covering 18 is used, it can be molded to a previously formed substrate of the core layer 12 and stiffening layers 14 and 16 as a secondary step. Advantageously, the materials can be molded to variable thickness to accommodate design requirements within a range of 0.1 to 1.5" thick.

The advantages of the headliner 10 according to the invention are best seen by reviewing various molded samples of laminates according to the invention and compared against prior headliner constructions.

Table 1 illustrates the increased modulus of elasticity obtained from the I-beam construction as compared to a single layer construction for various laminate thicknesses. Sample 1 is a construction according to the invention. It has an overall basis weight of 24 ounces/yd$^2$. The core layer has a basis weight of 12 ounces/yd$^2$ and a fiber blend of 25% Wellman 15 denier PET staple fibers (Wellman 15), 25% Wellman 6 denier PET staple fibers (Wellman 6), and 50% Unitika 4 denier PET sheath-core bicomponent type 7080 fibers (Unitika 4). The first and second stiffening layers both have a basis weight of 6 ounces/yd$^2$ and comprise a fiber blend of 50% Wellman 6 and 50% Unitika 4. The single layer construction (Single Layer 1) has an overall basis weight of 24 ounces/yd$^2$ and comprises a blend of fibers identical to the core layer of Sample 1. The Sample 1 and Single Layer 1 laminates were made by first pre-heating each laminate for 2–3 minutes by exposing the top and bottom of each laminate with an infrared heating element having a surface temperature of 650°–850° F. The preheated laminates were then placed in a flat mold under 1–2 psi where they cooled for approximately one minute. All of the laminates subsequently described herein were made in the same manner. Table 1 shows the modulus of elasticity according to ASTM D790 for Sample 1 and Single Layer 1, each having identical basis weight and thickness. From table 1 it can be seen that the I-beam construction of Sample 1 provides increased modulus of elasticity when compared to Single Layer 1 for a given thickness.

TABLE 1

Comparison of Modulus of Elasticity between laminate Construction and a single layer Construction at required Thickness [t7]

| Sample | Thickness (inches) | Modulus of Elasticity (psi; ASTM D790) |
| --- | --- | --- |
| Sample 1 | .12 | 16,800 |
| Single Layer 1 | .12 | 14,500 |
| Sample 1 | .45 | 1,700 |
| Single Layer 1 | .45 | 1,000 |
| Sample 1 | .68 | 680 |
| Single Layer 1 | .68 | 205 |

Table 2 illustrates the sound absorption benefits per ASTM C423 testing of the core layer 12 comprised of a fiber blend including fine denier fibers (Sample 2) as compared to a currently manufactured standard substrate (Standard Substrate) which do not have a fiber blend that includes fine denier fibers.

Sample 2 is only a core layer 12 having a basis weight of 12 ounces/yd$^2$ and a fiber blend of 20% Wellman 15,10% Wellman 4.75 denier PET sheath-core bicomponent type 712P fibers (Wellman 4.75), and 70% Wellman 1.2 denier PET staple fibers (Wellman 1.2).

The Standard Substrate weighs 18 ounces/yd$^2$ and has a fiber blend of 15% Wellman 4.75, and 85% Talon 6 denier mixed reclaimed synthetic fibers (Talon 6). Sample 2 has a thickness of 0.94" and the Standard Substrate has a thickness of 0.95 inches.

TABLE 2

Comparison of Sound Absorption Properties Between a Core Layer with Fine Denier Fibers and a Heavier Standard Substrate at an equal Thickness [t1]

| | Percent Sound Absorption at Various Frequencies | | | | |
| --- | --- | --- | --- | --- | --- |
| Sample | 250 HZ | 500 HZ | 1000 HZ | 2000 HZ | 4000 HZ |
| Sample 2 | 26 | 52 | 73 | 81 | 88 |
| Standard Substrate | 22 | 48 | 72 | 93 | 91 |

From table 2 it can be seen that even though Sample 2 with the fine fibers base two-thirds the mass to absorb sound, it still absorbs a similar percentage of sound over the tested range compared to that of the Standard Substrate, and it has a slightly better performance at the lower frequencies and slightly worse performance at the higher frequencies. Therefore, the core layer according to the invention, as illustrated by Sample 2, provides generally better sound absorption in the lower frequency range for a given thickness, but at a reduced weight. The reduced weight places less load on the headliner and helps to reduce the vehicle weight, which are advances over prior headliner constructions.

Table 3 illustrates the ASTM C423 sound absorbing properties of a laminate with I-beam construction comprising the core layer 12 and the stiffening layers 14 and 16 (Sample 3) as compared to a single layer (Single Layer 2) of sound absorbing material at a given basis weight and thickness. Sample 3 comprises a core layer weighing 12 ounces/yd$^2$ with a fiber blend of 50% Wellman 6, 35% Wellman 0.9 denier PET staple fibers (Wellman 0.9), and 15% Wellman 4.75. Sample 3 also includes stiffening layers 14 and 16 weighing 12 ounces/yd$^2$ and comprised of 20% Wellman 15, 50% Wellman 6, and 30% Unitika 4. Single Layer 2 is actually three layers of the same material. Each layer weighs 12 ounce/yd$^2$ with a fiber blend of 100% Talon 6 denier mixed reclaimed synthetic fibers (Talon 6). The Talon 6 material has a denier in the range of 3–15. The average denier is 6. The overall basis weight of Single Layer 2 is 36 ounces/yd$_2$.

Sample 3 and Single Layer 2 both have a basis weight of 36 ounces/yd$^2$ and are similar in thickness with Sample 3 having a thickness of 0.47" and the single layer having a thickness of 0.50". As can be seen from table 3, the laminate of Sample 3 according to the invention has significantly better sound absorbing properties throughout the entire tested range. Therefore, for a given weight and thickness, a laminate made according to the invention provides significantly better sound absorbing properties than previous single layer constructions.

TABLE 3

Comparison of Sound Absorption Properties Between a Laminate Construction and a Single Layer at equal Basis and Generally equal Thickness [t2]

| | Percent Sound Absorption at Various Frequencies | | | | |
| --- | --- | --- | --- | --- | --- |
| Sample | 250 HZ | 500 HZ | 1000 HZ | 2000 HZ | 4000 HZ |
| Sample 3 | 9 | 28 | 55 | 78 | 89 |
| Single Layer 2 | 7 | 15 | 40 | 59 | 83 |

Table 4 illustrates the structural rigidity of previous laminate constructions and laminate constructions according to the invention by comparing the sag of the materials at approximately equal thicknesses with varying basis weights and binder material percentages.

The cantilevered beam sag test consisted of taking a 3"×12" section from each flat molded sample and clamping the first two inches of the 12" length. The cantilevered beam was exposed to 185° F. for 24 hours under its own weight. The amount of sag was measured by the deflection of the extreme end of the cantilever beam sample.

Samples 4, 9 and 14 according to the invention all comprise a core layer 12 having a fiber blend of 30% Wellman 15, 45% Wellman 0.9, and 25% Unitika 4, and a basis weight of 12 ounces/yd$^2$. Additionally, the stiffening layers 14 and 16 have a basis weight of 12 ounces/yd$^2$ and are a blend of 50% Wellman 15 and 50% Wellman 4.75. Overall, the core layer 12 comprises 8% heat resistant thermoplastic binder material.

Samples 5, 10, and 15 have an overall basis weight of 36 ounces/yd$^2$. The core layer 12 has a basis weight of 12 ounces/yd$^2$ and a fiber blend of 30% Wellman 6, 45% Wellman 0.9 and 25% Unitika 4. The stiffening layers 14 and 16 each have a basis weight of 12 ounces/yd$^2$ and a fiber blend of 50% Wellman 15, 25% Unitika 4 and 25% polyester spunbond scrim. Overall, the core layer 12 comprises 25% heat resistant thermoplastic binder material.

Samples 6, 11, and 16 have an overall basis weight of 36 ounces/yd$^2$ and an overall composition comprising 33% heat resistant thermoplastic binder material. The core layer 12 has a basis weight of 12 ounces/yd$^2$ and a fiber blend of 67% Martin-Color-Fl 200 denier PET staple (Martin) and 33% BF Goodrich polyvinyl latex type 352 (BF Goodrich). The stiffening layers 14 and 16 each have a basis weight of 12 ounces/yd² and a fiber blend of 50% Wellman 15 and 50% Unitika 4.

TABLE 4

Comparison of Laminate Sag with and without Binder Fibers at Approximately equal Thickness

| Sample | Basis Weight (oz/yd²) | Thickness (inches) | Heat Resistant Thermoplastic Binder % (Percentage) | Sag (inches) |
|---|---|---|---|---|
| Prior 1 | 52 | .18 | 0 | .35 |
| Sample 4 | 36 | .18 | 8 | 3.94 |
| Sample 5 | 36 | .20 | 25 | 2.8 |
| Sample 6 | 36 | .19 | 33 | 1.65 |
| Sample 7 | 36 | .20 | 42 | 1.14 |
| Sample 8 | 36 | .12 | 50 | .59 |
| Prior 2 | 52 | .49 | 0 | 1.85 |
| Sample 9 | 36 | .38 | 8 | 3.46 |
| Sample 10 | 36 | .46 | 25 | 3.11 |
| Sample 11 | 36 | .44 | 33 | 1.46 |
| Sample 12 | 36 | .46 | 42 | 1.42 |
| Sample 13 | 36 | .47 | 50 | .67 |
| Prior 3 | 38 | .82 | 0 | 1.97 |
| Sample 14 | 36 | .57 | 8 | 3.51 |
| Sample 15 | 36 | .62 | 25 | 2.71 |
| Sample 16 | 36 | .60 | 33 | 1.69 |
| Sample 17 | 36 | .59 | 42 | 1.57 |
| Sample 18 | 36 | .68 | 50 | 0.39 |

Samples 7, 12, and 17 have an overall basis weight of 36 ounces/yd² and an overall composition of 42% heat resistant thermoplastic binder material. The core layer 12 has a basis weight of 12 ounces/yd² and a fiber blend of 30% Wellman 6, 45% Wellman 0.9, and 25% Unitika 4. The stiffening layers 14 and 16 each have an overall basis weight of 12 ounces/yd² and a fiber blend of 50% Wellman 15 and 50% Unitika 4.

Samples 8, 13, and 18 all have an overall basis weight of 36 ounces/yd² and an overall composition of 50% heat resistant thermoplastic binder material. The core layer 12 has a basis weight of 24 ounces/yd² and a fiber blend of 25% Wellman 6, 25% Wellman 15, and 50% Unitika 4. The stiffening layers 14 and 16 each have an overall basis weight of 6 ounces/yd² and a fiber blend of 50% Wellman 6 and 50% Unitika 4.

Table 4 includes three known previous laminate constructions identified as Prior 1, Prior 2, and Prior 3. Prior 1 and Prior 2 have an overall basis weight of 52 ounces/yd² and an overall composition that does not include a heat resistant thermoplastic binder. The core layer of Prior 1 and 2 each has a basis weight of 20 ounces/yd² and a fiber blend of 80% Martin 3 denier and 20% Wellman 4.75. The stiffening layers of Prior 1 and Prior 2 each have a basis weight of 16 ounces/yd and a fiber blend of 65% chopped fiberglass roving, 28% phenol-formaldehyde thermoset binder, 4% polyester spunbound scrim, and 3% polyethylene film.

Prior 3 has an overall basis weight of 38 ounces/yd² and an overall composition that does not include any heat resistant thermoplastic binder material. The core layer for Prior 3 has a basis weight of 16 ounces/yd² and a fiber blend of 44% Wellman 15 and 56% BF Goodrich. The stiffening layers of Prior 3 each have a basis weight of 11 ounces/yd² and a fiber blend of 54% chopped fiberglass roving, 38% phenol-formaldehyde thermoset binder, 5% polyester spunbond scrim, and 3% polyethylene film.

Table 4 compares the sag properties of these various known laminate constructions and laminate constructions according to the invention. Table 4 shows that for a given thickness, an increase in the heat resistant thermoplastic binder percentage will result in a decrease in the sag as tested. In other words, for a given thickness, as the binder material percentages increase, the laminate better resists sagging. Table 4 also shows that increased basis weight also provides increased resistance to sagging. As seen in table 4, one advantage of the invention is that for approximately equal basis weights, a laminate made according to the invention has significantly better sag resistance at a thickness less than previous laminate constructions. The ability of the invention to provide superior sag resistance at an equal basis weight but at a reduced thickness is advantageous over prior laminate constructions in that no structural rigidity is sacrificed but increased headroom is gained.

Table 5 illustrates the relative sound absorption characteristics of a composite laminate made according to the invention as compared to the sound absorption characteristics of the individual layers forming the composite. The laminate used in Table 5 has an overall thickness of 0.65 inches with a basis weight of 24 oz/yd². The laminate comprises a core layer sandwiched between outer layers. The fiber composition of the core layer comprises: 35% of 0.9 denier fibers, 25% of 3 denier fibers, and 40% of 15 denier fibers; resulting in a basis weight of 12 oz/yd² and a thickness of 0.35 inches. The fiber composition of each outer layer comprises: 50% of 3 denier fibers and 50% of 15 denier fibers; resulting in a basis weight of 6 oz/yd² and a thickness of 0.15 inches.

TABLE 5

Comparison of Sound Absorption Between the Composite of the Invention and the individual Layers.

| Layer | Weight (oz/yd²) | Thickness (inch) | ASTM C423 Reverberation Room Sound Absorption in % | | | | |
|---|---|---|---|---|---|---|---|
| | | | 250 Hz | 500 Hz | 1000 Hz | 2000 Hz | 4000 Hz |
| Composite | 24 | 0.65 | 22 | 54 | 80 | 90 | 90 |
| Outer | 6 | 0.15 | 2 | 7 | 13 | 18 | 32 |
| Core | 12 | 0.35 | 4 | 12 | 31 | 54 | 73 |
| Outer | 6 | 0.15 | 2 | 7 | 13 | 18 | 32 |

The core layer alone absorbs a much greater percentage of sound at all frequencies than the outer layers. In most cases, the core layer absorbs at least twice as much as the outer layers. The superior sound absorbing characteristics of the core layer over the outer layers is believed to be attributable to the use of the fine denier fibers in the core layer and the greater thickness of the core layer.

The composite has superior sound absorbing characteristics over all of the individual layers. The improved sound absorbing characteristics are believed to be mainly related to the increased thickness of the composite as compared to the individual layers.

The comparison of the sound absorbing characteristics between the composite and the individual layers highlights two guiding principles regarding sound absorption: the finer the fiber size, the better the sound absorbing characteristics, and the thicker the layer, the better the sound absorbing characteristics. These are general characteristics which do not hold under all situations.

The sound absorption property of a material is a direct function of resistivity, which is itself a function of the thickness of the layer and the total fiber surface area of the layer. In general, sound absorption increases as the resistivity increases—at least up to a point. The total fiber surface area is related to the relative proportion of fiber sizes in a given layer. All things being equal, the smaller the fiber size, the greater the total fiber surface area. Since most layers contain a mixture of different size fibers, the greater the percentage of fine fiber will generally yield greater sound absorption.

There is a point where the material is so resistant to the passage of sound waves that more sound is reflected than absorbed in response to further increases in the thickness or total fiber surface area. To understand this consequence, the resistivity can be thought of as increasing the average distance that a sound wave must traverse to pass through the layer. Both the thickness and total fiber surface area impact the average distance. The thinner the layer, the shorter will be the average distance through the layer. The greater the total fiber surface area, the more a particular sound wave will have to reflect from fiber to fiber to pass through the layer since it is less likely that a direct path exists. As the total fiber surface area increases, generally so does the number of fibers. At some point, the increased number of fibers will eliminate most of the interstitial spaces between the fibers and reduce or eliminate paths through the layer. At such time, the layer reflects more sound than is absorbed, reducing the sound absorption characteristics.

Another way to think of the effect of the increasing total fiber surface area is that in most cases it generally results in an increase of the density for the layer. At some point, the density will be great enough that the layer starts behaving more like a solid and starts reflecting sound.

While increasing the density of the layer ultimately negatively impacts sound absorption, in general, increasing the density will increase the stiffness or bending resistance of the layer, which helps to prevent sag. As shown in Table 4, in general, stiffness or bending resistance increases as the percentage of binder fiber increases. Generally, most binder fibers are not fine denier. Thus, increased rigidity, whether obtained by greater density, increased binder fibers, or both, can compromise the sound absorbing characteristics of the layer.

The laminate according to the invention applies these principals in a unique structure to obtain a laminate that is relatively lightweight and then, but still has the desired sound absorbing characteristics and strength required for a headliner. The invention uses an I-beam configuration having a generally three-layer structure. The outer layers are flexurally stiffer than the core layer, even though the core layer is generally thicker than the outer layers. The greater stiffness of the outer layers is attributable to their greater density and/or their greater percentage of binder fibers.

The relatively thin and stiff outer layers connected by the core layer forms a cross section that better resists bending than a laminate made solely from outer layer material or the core layer material, much like an I-beam or a box-beam construction.

The core layer, however, has better sound absorbing characteristics than the outer layers, which is attributable to the use of fine denier fibers and/or greater thickness. The selection of materials for the outer layers cannot ignore the sound absorbing properties since the sound must pass through as least one of the outer layers to reach the core layer.

It is within the scope of the invention for the core and outer layers to contain the same type of fibers, but not to the detriment of the respective predominate functions provided by the core layer and the outer layers. Care must be taken to make sure that the fiber mix, i.e., the percentage of each type of fiber in the layer, in either the core and outer layers does not impair the primary sound absorbing function of the core layer or the primary strength function of the outer layer.

The laminate according to the invention maintains the necessary balance between overall laminate thickness, sound absorption performance, and flexural stiffness by selecting the fiber mix such that the outer layers are generally more dense that the core layer and/or the core layer has a greater resistivity than the outer layers.

More specifically, it is preferred that the core layer include at least 25% of fine fibers in order that the laminate have suitable sound absorbing characteristics. The outer layers should not include more than 20% fine fibers.

The limits on the fiber mix for the core and outer layers is constrained by the functional requirements of each of the layers. A greater percentage of binder fibers leads to greater flexural stiffness, for a given weight and thickness of the laminate, and coarser binder fibers result in greater stiffness. Thus, another way in which to quantify the limits on the fiber mix of the core and outer layers is that to obtain the desired mix of sound absorption and flexural stiffness, the percentage of fine fibers in an outer layer should not be more than half the percentage of fine fibers in the core layer, up to a maximum of 20% fine fibers in the outer layer.

While particular embodiments of the invention have been shown, it will be understood that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A laminate for use in making a thermoformed article, the laminate comprising:

first and second strengthening layers and a core layer disposed between the strengthening layers, wherein the core layer comprises a batt of nonwoven thermoplastic fibers comprising:

20–50% by weight fine fibers with a denier in the range of 0.8–3.0;

10–50% by weight binder fibers for at least binding together the fine fibers; and other fibers having denier in the range of 4.0–15 denier, and wherein the first and second strengthening layers comprise a bait of nonwoven polymeric fibers comprising: more by weight coarser fibers than in the core layer;

whereby the strengthening layers provide the predominant flexural rigidity for the laminate and the core layer provides the predominant sound absorption for the laminate.

2. A laminate according to claim 1, wherein the thermoplastic fibers include polyester, polyolefins, and nylon.

3. A laminate according to claim 2 wherein the polyester fibers include bicomponent fibers.

4. A laminate according to claim 3 wherein the binder fibers have a denier in the range of 0.8–200.

5. A laminate according to claim 4 wherein the binder fibers have a denier in the range of 6–25.

6. A laminate according to claim 1 wherein the core layer batt has a basis weight in the range of 6–12 ounces/yd$^2$.

7. A laminate according to claim 6 wherein the unmolded core layer batt has a thickness of 0.5–1.0 inches.

8. A laminate according to claim 1 wherein the core layer batt has a basis weight of 6–24 ounces/yd$^2$.

9. A laminate according to claim 8 wherein the unmolded core layer batt has a thickness of 0.5–2.0 inches.

10. A laminate according to claim 1 wherein the binder fibers comprise bicomponent fibers.

11. A laminate according to claim 1 wherein the binder fibers comprise low melting point fibers.

12. A laminate according to claim 1 wherein the core layer batt comprises 35–45% by weight fine fibers having a denier of 0.8–1.2, 20–30% by weight fibers having a denier of 10–15, and the binder fibers comprise 30–40% by weight bicomponent fibers having a denier of 4–15.

13. A laminate according to claim 12 wherein the core layer bait comprises about 40% by weight fine fibers having a denier of about 1.0, about 25% by weight regular fibers having a denier of about 15, and about 35% by weight bicomponent fibers having a denier of about 5.

14. A laminate according to claim 12, and further comprising a first and second web adhesive layer, the first web adhesive layer being disposed between the core layer and the first strengthening layer, and the second web adhesive being disposed between the core layer and the second strengthening layer, whereby the web adhesives enhance the bonding between the strengthening layers and the core layer.

15. A laminate according to claim 14 wherein the web adhesive is a sheet of nonwoven polyester fibers.

16. A laminate according to claim 1, and further comprising a first and second web adhesive layer, the first web adhesive layer being disposed between the core layer and the first strengthening layer, and the second web adhesive being disposed between the core layer and the second strengthening layer, whereby the web adhesives enhance the bonding between the strengthening layers and the core layer.

17. A laminate according to claim 16, and further comprising a cover material bonded to the lower surface of the second strengthening layer.

18. A laminate according to claim 1 wherein the strengthening layer bans comprise:

50–100% by weight polymeric fibers with a denier of 0.8–200, and

0–50% by weight binder materials.

19. A laminate according to claim 18 wherein the binder materials are binder fibers.

20. A laminate according to claim 18 wherein the polymeric fibers have a denier of 3–25.

21. A laminate according to claim 20 wherein the strengthening layer batts have a basis weight of 3–24 ounces/yd$^2$.

22. A laminate according to claim 21 wherein the unmolded strengthening layer batts have a thickness of 0.1–1.0 inches.

23. A laminate according to claim 22 wherein the binder materials include a thermosetting resin.

24. A laminate according to claim 23 wherein the thermosetting resin is a powder which is present in an amount up to 20% by weight in the strengthening layers.

25. A laminate according to claim 1, wherein the other fibers form the balance of the fibers in the core layer.

26. A laminate according to claim 1, wherein the strengthening layers have a greater density than the core layer.

27. A laminate according to claim 26, wherein the strengthening layers are thinner than the core layer.

28. A laminate according to claim 27, wherein the core layer has a greater resistivity than the strengthening layers.

29. A laminate according to claim 1, wherein each strengthening layer comprises less than 20% by weight fine fibers.

30. A laminate according to claim 29, wherein the core layer comprises at least 25% by weight fine fibers.

31. A laminate according to claim 1, wherein the percentage of fine fibers in each of the strengthening layers is not greater than half the percentage of fine fibers in the core layer and the fine fibers of each strengthening layer do not exceed 20% by weight.

32. A laminate according to claim 1 wherein the denier of the core layer fine fibers is below 2.7.

33. A headliner for a vehicle comprising:

first and second strengthening layers and a core layer disposed between the strengthening layers, wherein the core layer comprises a bait of nonwoven thermoplastic fibers comprising:

20–50% by weight fine fibers with a denier in the range of 0.8–3.0;

10–50% by weight binder fibers for at least binding together the fine fibers; and wherein the first and second strengthening layers comprise a batt of nonwoven polymeric fibers comprising: more by weight coarser than in the core layer;

whereby the strengthening layers provide the predominant flexural rigidity for the headliner and the core layer provides the predominant sound absorption for the headliner.

34. A headliner according to claim 33 wherein the thermoplastic fibers include polyester, polyolefins, and nylon.

35. A headliner according to claim 34 wherein the polyester fibers include bicomponent fibers.

36. A headliner according to claim 35 wherein the binder fibers have a denier in the range of 0.8–200.

37. A headliner according to claim 36 wherein the binder fibers have a denier in the range of 6–2.5.

38. A headliner according to claim 37 wherein the core layer batt has a basis weight of 6–12 ounces/yd$^2$.

39. A headliner according to claim 38 wherein the core layer batt has a molded thickness of 0.1–1.3 inches.

40. A headliner according to claim 36 wherein the core layer ban has a basis weight of 6–24 ounces/yd$^2$.

41. A headliner according to claim 40 wherein the core layer batt has an molded thickness of 0.1–1.5 inches.

42. A headliner according to claim 33 wherein the binder material comprises a thermosetting resin.

43. A headliner according to claim 42 wherein the thermosetting resin comprises up to 20% of the core layer.

44. A headliner according to claim 33 wherein the core layer batt comprises 35–45% fine fibers having a denier of 0.8–1.2, 20–30% other fibers having a denier of 10–15, and the binder materials comprise 30–40% bicomponent fibers having a denier of 4–15.

45. A headliner according to claim 44 wherein the core layer bait comprises about 40% fine fibers having a denier of about 1.0, about 25% other fibers having a denier of about 15, and about 35% bicomponent fibers having a denier of about 5.

46. A headliner according to claim 45, and further comprising a first and second web adhesive layer, the first web adhesive layer being disposed between the core layer and the first strengthening layer, and the second web adhesive layer being disposed between the core layer and the second strengthening layer, whereby the web adhesives enhance the bonding between the strengthening layers and the core layer.

47. A headliner according to claim 46 wherein the web adhesive is a sheet of nonwoven polyester fibers.

48. A headliner according to claim 46 wherein the strengthening layer batts comprise:

50–100% by weight polymeric fibers with a denier of 0.8–200, and

0–50% by weight binder materials.

49. The headliner according to claim 48, wherein the other fibers have a denier between 4–15.

50. The headliner according to claim 48, wherein the polymeric fibers have a denier of 3–25.

51. The headliner according to claim 50, wherein the polymeric fibers are thermoplastic fibers.

52. A laminate for use in making a thermoformed article, the laminate comprising:

first and second strengthening layers and a core layer disposed between the strengthening layers, with the strengthening layers providing the predominant flexural rigidity for the laminate and the core layer providing the predominant sound absorption for the laminate;

the core layer comprises a batt of nonwoven thermoplastic fibers comprising:
20–50% fine fibers with a denier in the range of approximately 0.8–3.0 denier for absorbing sound; and
10–50% binder fibers for at least binding together the fine fibers; and the first and second strengthening layers comprise a batt of nonwoven polymeric fibers, wherein the first and second strengthening layers have more by weight coarser fibers than in the core layer and the core layer has a resistivity greater than at least one of the first and second strengthening layers.

53. The laminate according re claim 52, wherein the strengthening layers are thinner than the core layer.

54. The laminate according to claim 52, wherein each strengthening layer comprises less than 20% fine fibers.

55. The laminate according to claim 54, wherein the core layer comprises at least 25% fine fibers.

56. The laminate according to claim 52, wherein the percentage of fine fibers in each of the strengthening layers is not greater than half the percentage of fine fibers in the core layer and the fine fibers of each strengthening layer do not exceed 20%.

* * * * *

UNITED STATES PATENT AND TRADEMARK OFFICE
CERTIFICATE OF CORRECTION

PATENT NO. : 6,756,332 B2
DATED : June 29, 2004
INVENTOR(S) : Michael D. Sandoe and Michael G. Zimmer It is certified that error appears in the above-identified patent and that said Letters Patent is hereby corrected as shown below:

Column 2,
Line 45, "a bait of" should read -- a batt of --
Line 49, "a bait" should read -- a batt --

Column 3,
Lines 28-49, these two paragraphs were deleted in the April 15, 2003 Amedment and Response to Office Action Column 4,
Line 37, "of tine" should read -- of fine --
Line 40, "At least seine of" should read -- At least some of --
Line 62, "Hoechstj58" should read -- Hoechst J58 --

Column 7,
Line 49, "fine fibers base two-thirds" should read -- fine fibers has two-thirds --

Column 10,
Line 9, "spunbound scrim" should read -- spunbond scrim --

Column 13,
Line 4, "a bait of" should read -- a batt of --
Line 36, "layer bait comprises" should read -- layer batt comprises --
Line 60, "layer bans comprise" should read -- layer batts comprise --

Column 14,
Line 35, "a bait of" should read -- a batt of --
Line 43, "coarser than" should read -- coarser fibers than --
Line 55, "range of 6-2.5." should read -- range of 6-25. --

Column 15,
Line 7, "layer bait comprises" should read -- layer batt comprises --

UNITED STATES PATENT AND TRADEMARK OFFICE
CERTIFICATE OF CORRECTION

PATENT NO. : 6,756,332 B2
DATED : June 29, 2004
INVENTOR(S) : Michael D. Sandoe and Michael G. Zimmer It is certified that error appears in the above-identified patent and that said Letters Patent is hereby corrected as shown below:

Column 16,
Line 20, "according re claim 52" should read -- according to claim 52 --

Signed and Sealed this

Twenty-third Day of November, 2004

JON W. DUDAS
*Director of the United States Patent and Trademark Office*